UNITED STATES PATENT OFFICE.

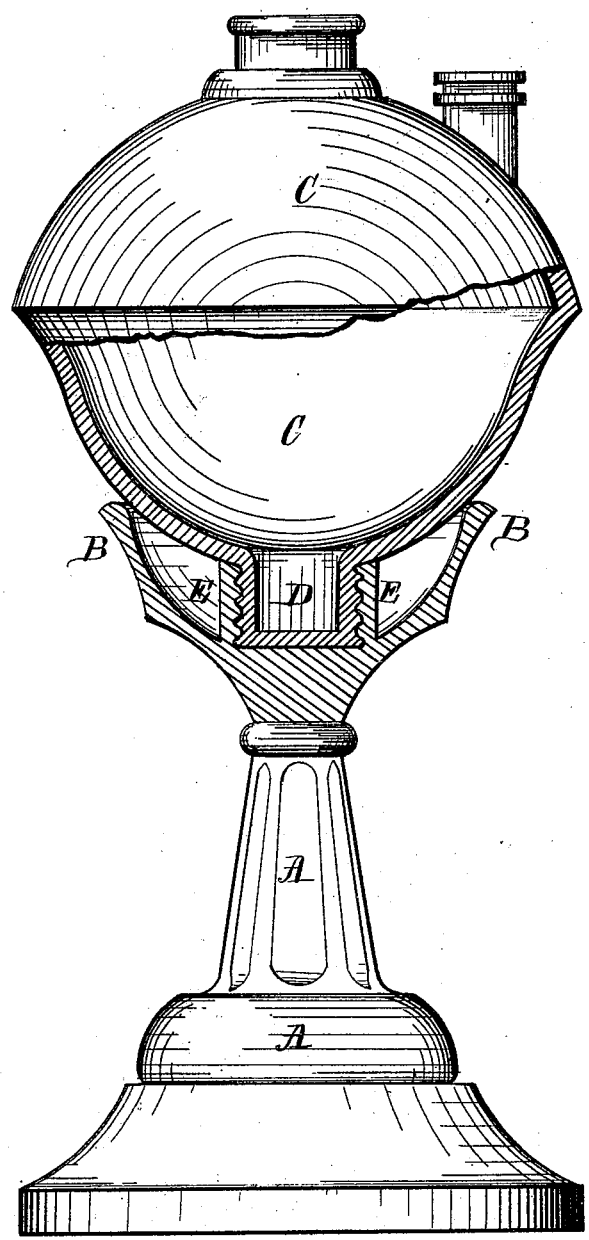

ALONZO FRENCH, OF PHILADELPHIA, PENNSYLVANIA.

IMPROVEMENT IN LAMPS.

Specification forming part of Letters Patent No. 171,929, dated January 11, 1876; application filed May 28, 1875.

*To all whom it may concern:*

Be it known that I, ALONZO FRENCH, of the city and county of Philadelphia, in the State of Pennsylvania, have invented a new and useful Improvement in Lamps; and I do hereby declare the following to be a full, clear, and exact description thereof, which will enable others skilled in the art to which it appertains to make and use the same, reference being had to the accompanying drawing, in which the said improvement is represented partly in section.

This improvement, which is applicable to lamps of various kinds—chandeliers, brackets, &c.—consists of a fount made with a stem, which fits into a socket in the drip-cup in such a manner that by means of said stem the fount is firmly supported on the cup.

A in the drawing represents the stand of an ordinary stand-lamp, to which is cemented or otherwise secured the drip-cup B, represented in section. C is the fount of the lamp, represented partly, also, in section, so as to show its attachment to the drip-cup. This fount C is made with a stem, D, which fits into a corresponding socket, E, in the drip-cup. In the drawing, the stem is shown as screwed into the socket, which method of attachment I prefer, although they may be attached by cement, or in any other convenient way.

When the improvement is applied to gas-fixtures, chandeliers, &c., the drip-cup should be made with a screw-thread, so that it can be screwed onto the nipple of the gas-fixture or chandelier.

It will be seen that this improvement presents a firm and convenient method of supporting the fount, and at the same time obstructs but little of the light, only a small portion of the bottom of the fount being covered by the drip-cup.

What I claim as my invention, and desire to secure by Letters Patent of the United States, is—

1. The combination, substantially as described, of the drip-cup B, made with a socket, E, and the oil-fount C, supported on said drip-cup by means of the stem D fitting into said socket.

ALONZO FRENCH.

Witnesses:
 HARRY MARSHAM,
 OWEN DARCY.